US010042139B2

(12) United States Patent
Ho et al.

(10) Patent No.: US 10,042,139 B2
(45) Date of Patent: Aug. 7, 2018

(54) CAMERA LENS MODULE (71) Applicant: SAE Magnetics (H.K.) Ltd., Hong Kong (HK)

(72) Inventors: Yiu Sing Ho, Hong Kong (HK); Yong Bing Hu, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 15/296,004

(22) Filed: Oct. 17, 2016

(65) Prior Publication Data
US 2017/0146771 A1 May 25, 2017

(30) Foreign Application Priority Data

Nov. 20, 2015 (CN) .......................... 2015 1 0810390
Oct. 7, 2016 (CN) .......................... 2016 1 0871964

(51) Int. Cl.
| | |
|---|---|
| *G02B 7/02* | (2006.01) |
| *G02B 7/09* | (2006.01) |
| *G03B 13/36* | (2006.01) |
| *G03B 11/00* | (2006.01) |
| *G02B 5/20* | (2006.01) |
| *H04N 5/225* | (2006.01) |

(52) U.S. Cl.
CPC ................. *G02B 7/09* (2013.01); *G02B 5/20* (2013.01); *G02B 7/026* (2013.01); *G03B 11/00* (2013.01); *G03B 13/36* (2013.01); *H04N 5/2253* (2013.01); *H04N 5/2254* (2013.01); *H04N 5/2257* (2013.01)

(58) Field of Classification Search
CPC .......... G02B 7/02; G02B 7/021; G02B 7/026; H04N 5/2253; H04N 5/2254; H04N 5/2257
USPC ................. 359/811, 819, 822–826, 829, 830
See application file for complete search history.

(56) References Cited

U.S. PATENT DOCUMENTS

| | | | |
|---|---|---|---|
| 2009/0225452 A1* | 9/2009 | Wu ........................ | G02B 7/023 359/824 |
| 2012/0008221 A1* | 1/2012 | Min .................... | H02K 41/0356 359/824 |

* cited by examiner

*Primary Examiner* — Darryl J Collins (57) ABSTRACT

A camera lens module includes a case and a bottom coupled with the case to form an accommodating space, having an upper spring, a lens assembly and a lower spring accommodated in the accommodating space. The lens assembly includes a lens barrel main body and a group of lenses provided in the lens barrel main body. An upper end of the lens barrel main body is suspended on the upper spring, and a lower end of the lens barrel main body is suspended on the lower spring. The upper spring is connected with the case, and the lower spring is connected with the bottom. In the camera lens module, the lens assembly is directly suspended on upper and lower springs. This eliminates the camera lens mount of existing camera lens module as well as the connecting screw structure between the camera lens mount and the lens barrel.

9 Claims, 10 Drawing Sheets

CAMERA LENS MODULE

CROSS REFERENCE TO RELATED APPLICATIONS

The present application claims the benefit of Chinese Patent Application Nos. 201510810390.3 filed on Nov. 20, 2015 and 201610871964.2 filed on Oct. 7, 2016. All the above are hereby incorporated by reference.

FIELD OF THE TECHNOLOGY

The present application relates to a camera lens module, and particularly to a large aperture camera lens module.

BACKGROUND

Figure 1:
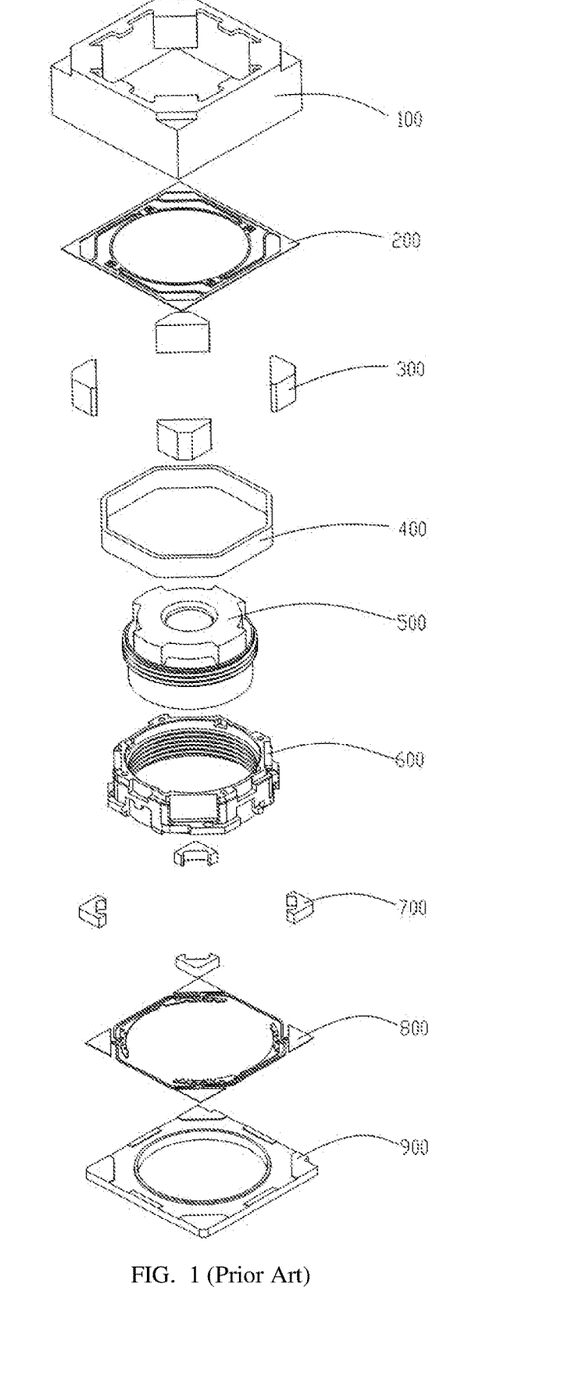
FIG. 1 is an exploded view of a camera lens module of the existing technology.
Figure 2:
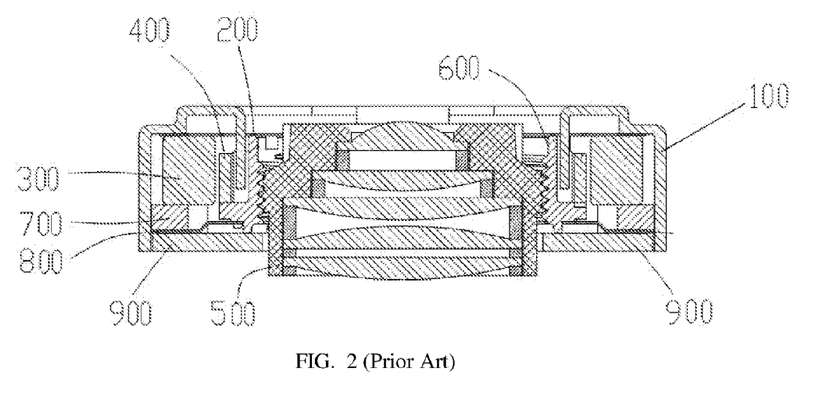
FIG. 2 is a cross sectional view of the camera lens module shown in FIG. 1.

FIGS. 1 and 2 are illustrative diagrams of existing micro camera lens module. The camera lens module includes a case 100, as well as an upper spring 200, a magnetic element 300, a coil 400, a camera lens 500, a camera lens mount 600, a spacer block 700, a lower spring 800 and a bottom 900 accommodated inside the case 100. The camera lens 500 includes a lens barrel and a group of lenses provided inside the lens barrel. The lens barrel of the camera lens 500 and the camera lens mount 600 are connected together by screws. Since there is the connecting screw structure between the lens barrel and the camera lens mount 600, some space will be occupied. This limits the enlargement of aperture of the camera lens 500 to a certain degree, and keeps the aperture of the camera lens 500 in a relatively small size.

SUMMARY

An object of the present application is to provide a camera lens module that can enlarge the camera lens aperture.

The camera lens module of the present application may include a case and a bottom coupled with the case to form an accommodating space, and may include an upper spring, a lens assembly and a lower spring accommodated in the accommodating space. The lens assembly may include a lens barrel main body and a group of lenses provided in the lens barrel main body. An upper end of the lens barrel main body may be suspended on the upper spring and a lower end of the lens barrel main body may be suspended on the lower spring. The upper spring may be connected with the case, and the lower spring may be connected with the bottom.

The camera lens module of the present application may further include a coil, and a magnetic element that interacts with the coil for driving the lens assembly to move when the coil is energized. The coil may be provided on an outer periphery of the lens barrel main body, and the magnetic element may be provided inside the case and disposed around the lens barrel main body.

The camera lens module of the present application may further include a spacer block. The spacer block may be disposed between the magnetic element and the bottom, and can press the lower spring on the bottom.

In the camera lens module of the present application, the outer periphery of the lens barrel main body may be formed with a step for accommodating the coil, and the coil may be provided on the step. A gap may be formed between the coil and the lens barrel main body. An inner edge of an upper end of the case may be formed with a downwardly extending insert, and the insert can be inserted into the gap.

In the camera lens module of the present application, the upper spring may include an outer frame, an inner frame, and a flexible arm connecting the outer and inner frames. The outer frame may be connected with the case, and the inner frame may be connected with the upper end of the lens barrel main body.

In the camera lens module of the present application, the upper end of the lens barrel main body may be formed with an annular flange for connecting with the inner frame.

In the camera lens module of the present application, the lower spring may include an outer connecting plate, an inner connecting plate, and a flexible arm connecting the outer and inner connecting plates. The outer connecting plate may be connected with the bottom, and the inner connecting plate may be connected with the lower end of the lens barrel main body.

The camera lens module of the present application may further include a flexibility-adjusting element, a frame, and a printed circuit board stacked one on top of the other in order. The bottom may be provided on the flexibility-adjusting element, and the flexibility-adjusting element can be used for fine tuning the position of the lens assembly on an optical axis. The frame may be provided with a filter, and an image-sensing element may be provided on the printed circuit board.

In the camera lens module of the present application, the flexibility-adjusting element may include a frame-shaped base plate, and a plurality of spring plates being formed on and projected from the base plate, and hollow grooves corresponding to the spring plates may be formed on the base plate.

In the camera lens module of the present application, the flexibility-adjusting element may be coupled with the bottom.

The camera lens module of the present application has the following beneficial effects. In the camera lens module of the present application, the lens assembly can be directly suspended on upper and lower springs. This eliminates the camera lens mount of existing camera lens module as well as the connecting screw structure between the camera lens mount and the lens barrel. This can save some space such that the aperture of the lens assembly can be enlarged. The camera lens module of the present application can also reduce the total track length (TTL) of camera lens of the camera lens module, simplify the assembling process of the camera lens module, and lower the cost of the camera lens module.

BRIEF DESCRIPTION OF THE DRAWINGS

Specific embodiments will now be described by way of example with reference to the accompanying drawings wherein.

DETAILED DESCRIPTION

To have a clear understanding of the technical features, objects and effects of the camera lens module of the present application, specific embodiments will now be described in detail with reference to the accompanying drawings.

Embodiments of the camera lens module of the present application are described below in detail. These embodiments are shown in the accompanying drawings. Like reference numerals representing like parts with like functions are used throughout the drawings.

It should be appreciated that in the description of the camera lens module of the present application, the terms "front", "rear", "top", "bottom", "upper end", "lower end", "upper portion", "lower portion", etc. refer to the orientation or position of a structure as it is oriented and positioned in the drawings. Those terms are used to simplify the description and do not indicate or imply that the structure must have a specific orientation or operate in a specific position. Those terms should not be considered as limiting.

Figure 3:
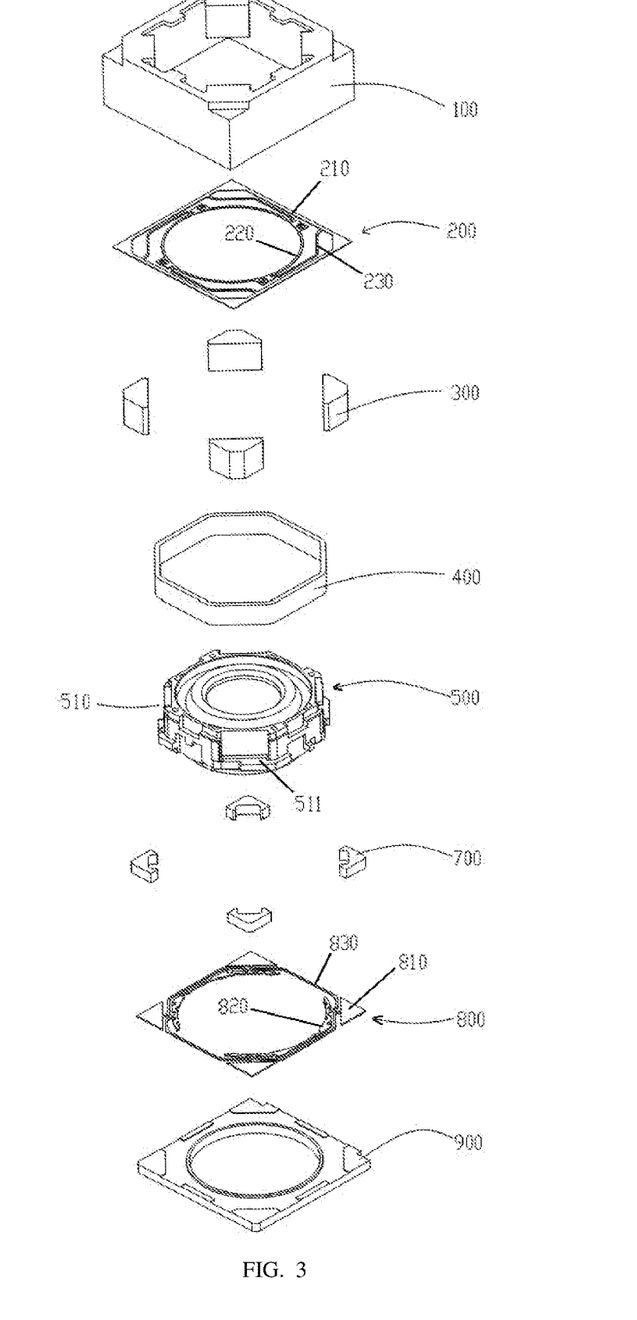
FIG. 3 is an exploded view of an embodiment of the camera lens module of the present application.
Figure 4:
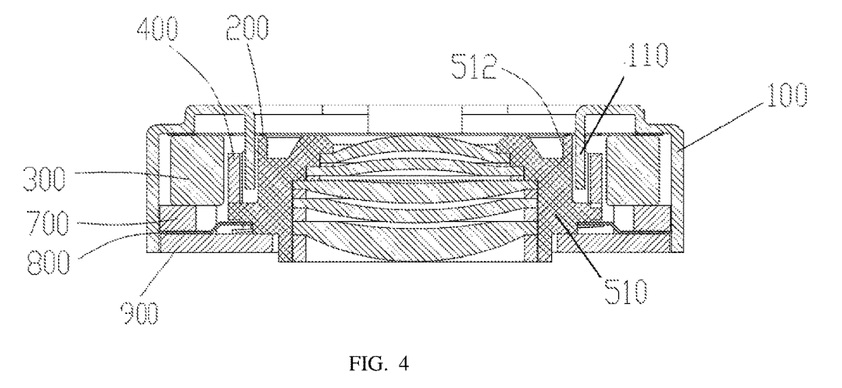
FIG. 4 is a cross sectional view of the camera lens module shown in FIG. 3.
Figure 5:
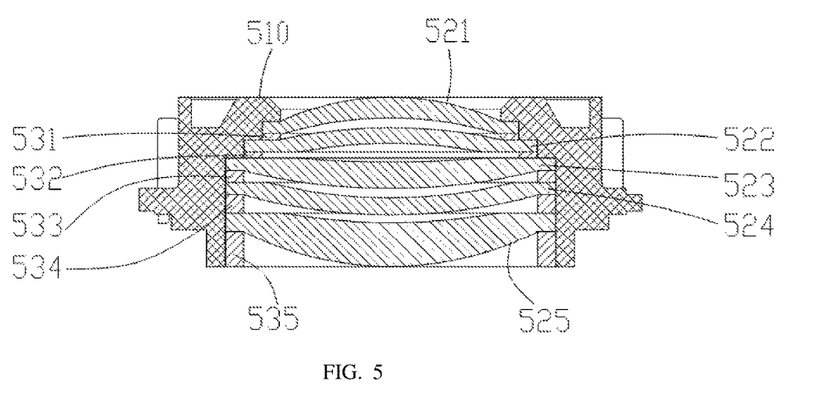
FIG. 5 is a cross sectional view of a lens assembly of the camera lens module shown in FIG. 3.

FIG. 3 is an exploded view of an embodiment of the camera lens module of the present application. In the embodiment, the camera lens module may include a case 100, and a bottom 900 coupled with the case 100 to form an accommodating space. The bottom 900 may be coupled with a lower end of the case 100. An upper end of the case 100 and the bottom 900 may be formed with an opening. The camera lens module may also include an upper spring 200, a lens assembly 500 and a lower spring 800 received in the accommodating space formed by the case 100 and the bottom 900. Referring to FIGS. 4 and 5, the lens assembly 500 may include a lens barrel main body 510, and a group of lenses provided in the lens barrel main body 510. In the present embodiment, the group of lenses may include lenses 521, 522, 523, 524, 525. The lenses 521, 522, 523, 524, 525 can be separated by spacer pieces 531, 532, 533, 534, 535. An upper end of the lens barrel main body 510 may be suspended on the upper spring 200, and a lower end of the lens barrel main body 510 may be suspended on the lower spring 800. The upper spring 200 may be connected with the case 100, and the lower spring 800 may be connected with the bottom 900.

Referring to FIGS. 3-5, the camera lens module of the present application may include a coil 400 and a magnetic element 300. The magnetic element 300 may include a plurality of permanent magnets. For example, in the present embodiment, there are four permanent magnets.

The magnetic element 300 can generate electromagnetic force to drive the lens assembly 500 to move when cooperating with the coil 400 which is energized. The coil 400 may be provided on an outer periphery of the lens barrel main body 510. The magnetic element 300 may be provided inside the case 100 and disposed around the lens barrel main body 510. To facilitate the accommodation of the coil 400, an outer periphery of the lens barrel main body 510 may be formed with a step 511 for accommodating the coil 400. The coil 400 may be provided on the step 511. A gap may be formed between the coil 400 and the lens barrel main body 510. An inner edge of an upper end of the case 100 may be formed with a downwardly extending insert 110. The insert 110 can be inserted into the gap. This can serve the function of positioning and guiding of the lens assembly 500, especially when the lens assembly 500 is moving.

Referring to FIGS. 3-5, the camera lens module of the present application may further include at least one spacer block 700. In the present embodiment, there are four spacer blocks 700 disposed at four corners of the bottom 900. The spacer blocks 700 may be disposed between the magnetic element 300 and the bottom 900, and press the lower spring 800 between the spacer blocks 700 and the bottom 900.

Referring to FIGS. 3-5, in the present embodiment, the upper spring 200 may include an outer frame 210, an inner frame 220, and a flexible arm 230 connecting the outer and inner frames 210, 220. The outer frame 210 may be connected with the case 100. It may be connected with the case 100 by using adhesive or other suitable method.

The inner frame 220 may be connected with the upper end of the lens barrel main body 510. It may be connected with the lens barrel main body 510 by using adhesive or other suitable method. To facilitate the connection of the lens barrel main body 510 with the upper spring 200, the upper end of the lens barrel main body 510 may be formed with an annular flange 512. The inner frame 220 of the upper spring 200 may be connected with the annular flange 512 of the lens barrel main body 510. For example, they can be adhered together by adhesive. The lower spring 800 may include an outer connecting plate 810, an inner connecting plate 820, and a flexible arm connecting the outer and inner connecting plates 810, 820. The outer connecting plate 810 may be connected with the bottom 900. It may be connected with the bottom 900 by using adhesive or other suitable method. The inner connecting plate 820 may be connected with the lower end of the lens barrel main body 510. It may be connected with the lower end of the lens barrel main body 510 by using adhesive or other suitable method. Hence, the lens assembly can be flexibly held between the upper spring 200 and the lower spring 800. Under the interaction of the magnetic element 300 and the coil 400, the position of the lens assembly 500 on the optical axis can be adjusted in order to achieve auto-focusing.

Figure 6:
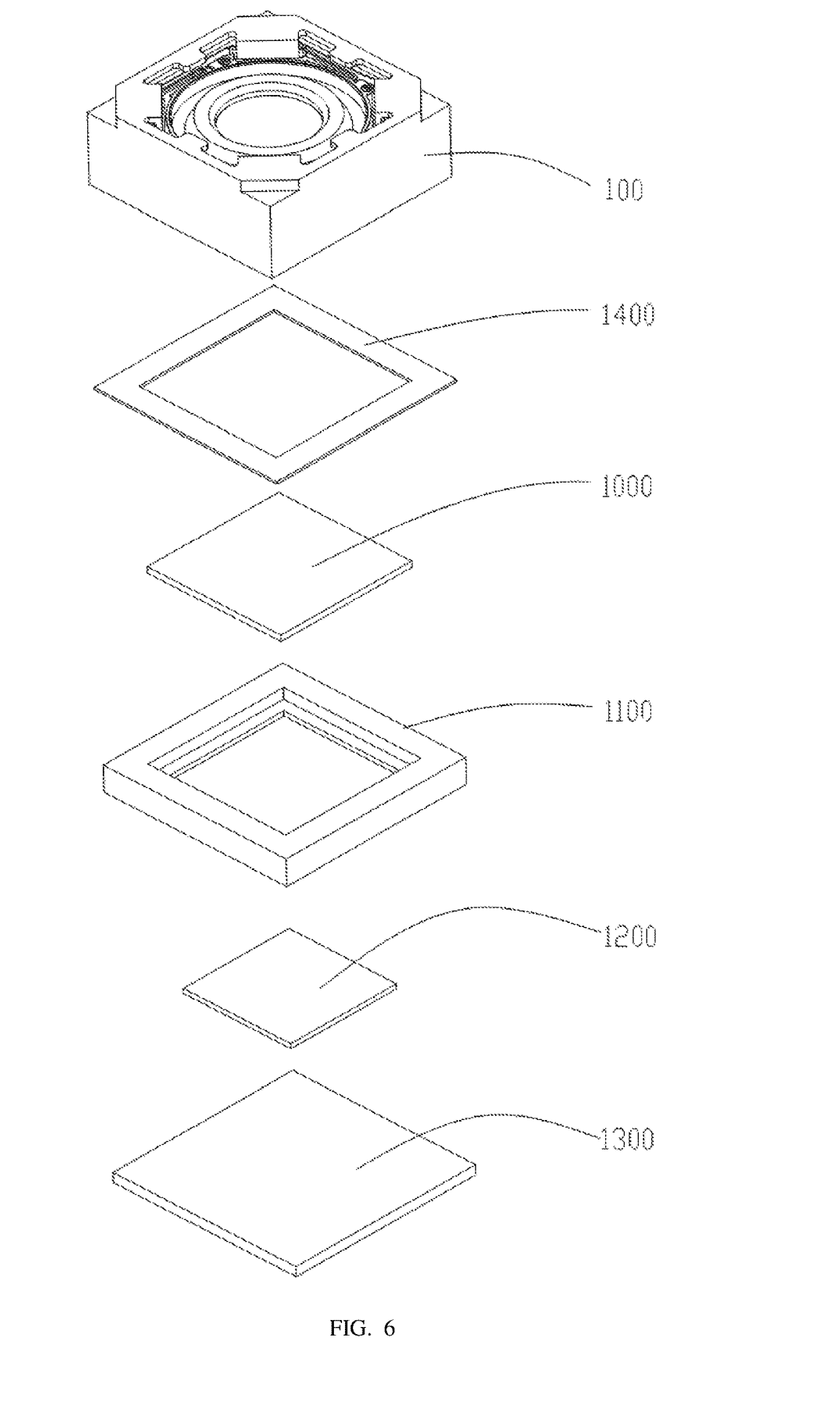
FIG. 6 is an exploded view of another embodiment of the camera lens module of the present application.
Figure 7:
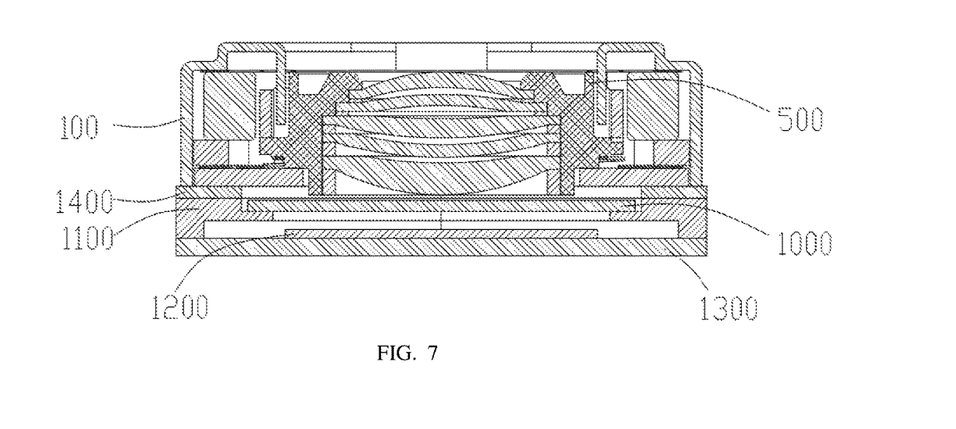
FIG. 7 is a cross sectional view of the camera lens module shown in FIG. 6.
Figure 8:
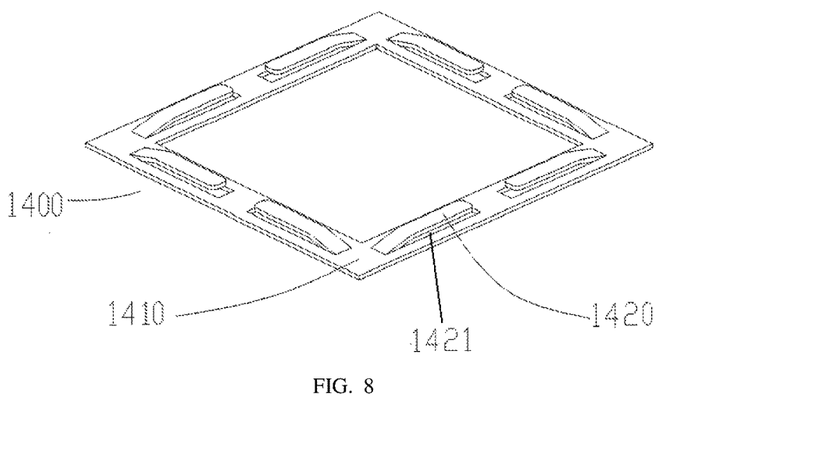
FIG. 8 is a perspective view of a flexibility-adjusting element of the camera lens module shown in FIG. 6.

FIGS. 6-8 show another embodiment of the camera lens module of the present application. Apart from having the camera lens module of the previous embodiment, the camera lens module of the present embodiment may also include a flexibility-adjusting element 1400, a frame 1100, and a printed circuit board 1300 stacked one on top of the other in order. The bottom 900 may be provided on the flexibility-adjusting element 1400. The flexibility-adjusting element 1400 may be used for fine tuning the position of the lens assembly on the optical axis. The frame 1100 may be provided with a filter 1000. An image-sensing element 1200 may be provided on the printed circuit board 1300. Referring to FIG. 8, in the present embodiment, the flexibility-adjusting element 1400 may include a frame-shaped base plate 1410, and a plurality of spring plates 1420 formed on and projected from the base plate 1410. Hollow grooves 1411 corresponding to the spring plates 1420 may be formed on the base plate 1410 so as to maintain the flexibility of the flexible plates 1420. The flexibility-adjusting element 1400 may be coupled with the bottom 900.

Figure 9:
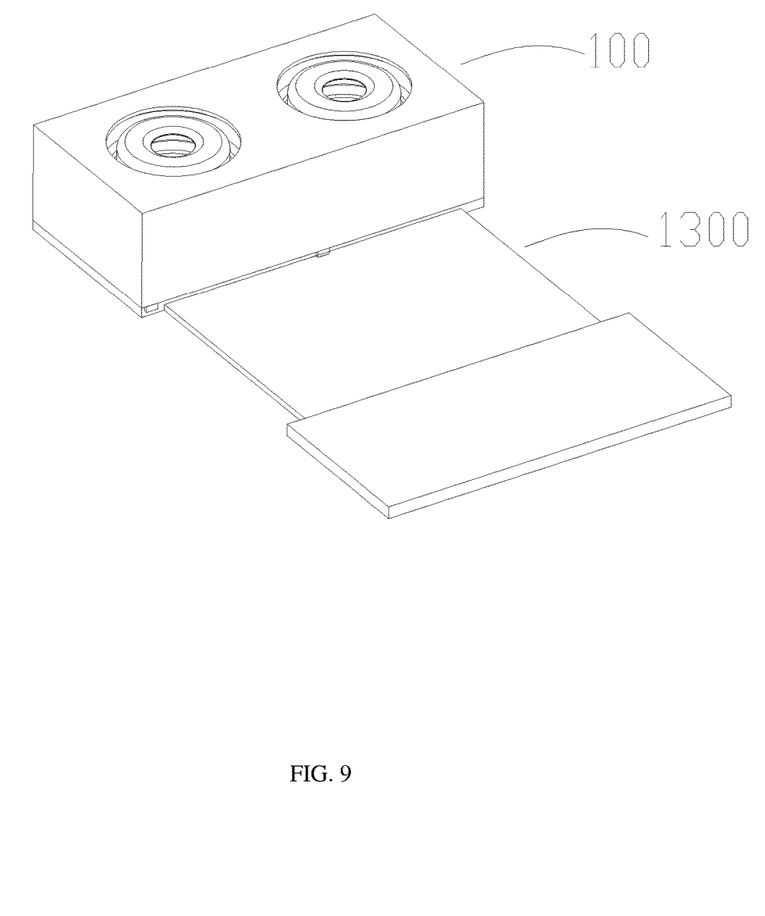
FIG. 9 is a perspective view of a further embodiment of the camera lens module of the present application.
Figure 10:
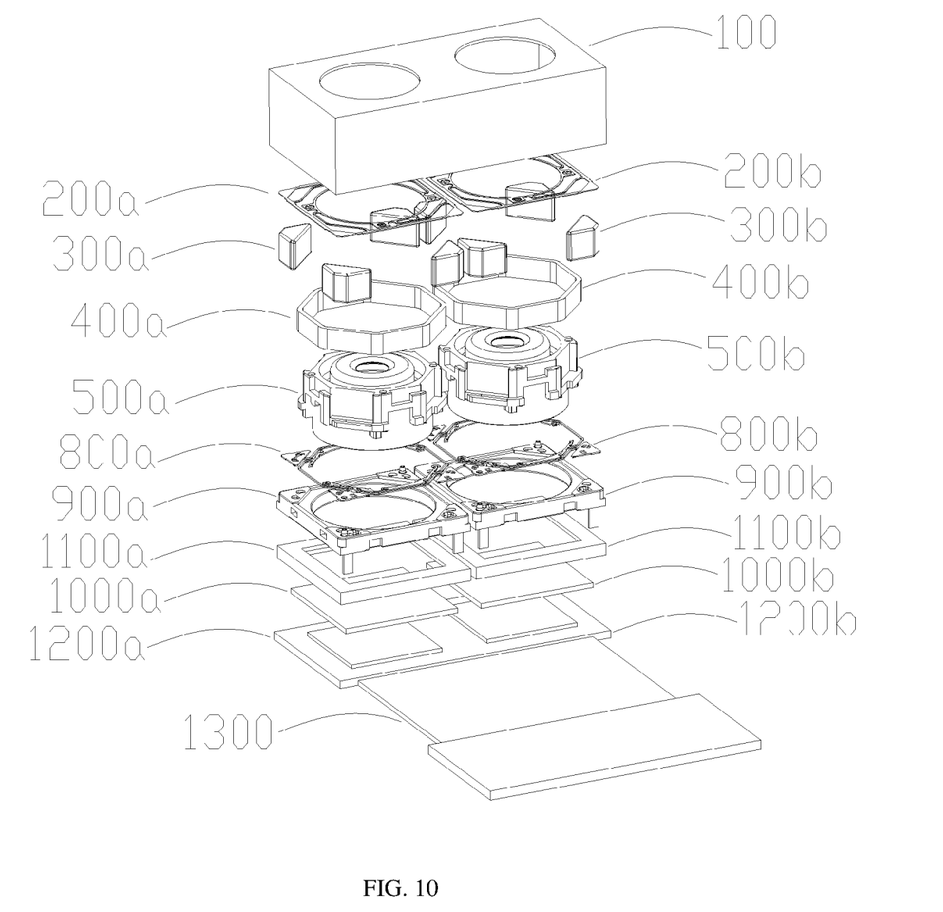
FIG. 10 is an exploded view of the camera lens module shown in FIG. 9.

FIGS. 9 and 10 show a further embodiment of the camera lens module of the present application. This embodiment covers a camera lens module having dual camera lens.

Camera lens module having dual camera lens has the following advantages: (1) take clearer photo; (2) increase the amount of light entrance and raise optical sensitivity; (3) realize take photo first and focus later; and (4) increase focusing speed.

As shown in FIGS. 9 and 10, the camera lens module of the present embodiment is a camera lens module having dual camera lens and a single printed circuit board. That means two camera lenses can be provided on the same printed circuit board. The detailed structure of the camera lens module having dual camera lens may include a case 100, and first and second bottoms 900a, 900b coupled with the case 100 to form first and second accommodating spaces respectively. The first accommodating space may accommodate therein a first camera lens unit, and the second accommodating space may accommodate therein a second camera lens unit. Two camera lens apertures may be formed on the case 100 that correspond to the first and second camera lens units respectively. The first camera lens unit may include a first upper spring 200a, a first lens assembly 500a and a first lower spring 800a. An upper end of a lens barrel main body of the first lens assembly 500a may be suspended on the first upper spring 200a, and a lower end of the lens barrel main body may be suspended on the first lower spring 800a. The first upper spring 200a may be connected with the case 100, and the first lower spring 800a may be connected with the bottom 900a. The first camera lens unit may further include a first coil 400a and a first magnetic element 300a for driving the first lens assembly 500a to move. A first frame 1100a and a first image-sensing element 1200a corresponding to the first camera lens unit may be provided on a printed circuit board 1300. A first filter 1000a may be provided on the first frame 1100a. The second camera lens unit may include a second upper spring 200b, a second lens assembly 500b and a second lower spring 800b. An upper end of a lens barrel main body of the second lens assembly 500b may be suspended on the second upper spring 200b, and a lower end of the lens barrel main body may be suspended on the second lower spring 800b. The second upper spring 200b may be connected with the case 100, and the second lower spring 800b may be connected with the bottom 900b. The second camera lens unit may further include a second coil 400b and a second magnetic element 300b for driving the second lens assembly 500b to move. A second frame 1100b and a second image-sensing element 1200b corresponding to the second camera lens unit may be provided on the printed circuit board 1300. A second filter 1000b may be provided on the second frame 1100b. The other structures of the first and second camera lens units are similar to the structures of the camera lens module of the embodiment shown in FIG. 3 and will not be repeated. Adopting the structures of dual camera can make the structure of the camera lens module more compact, save space, and reduce the size of the whole device.

Figure 11:
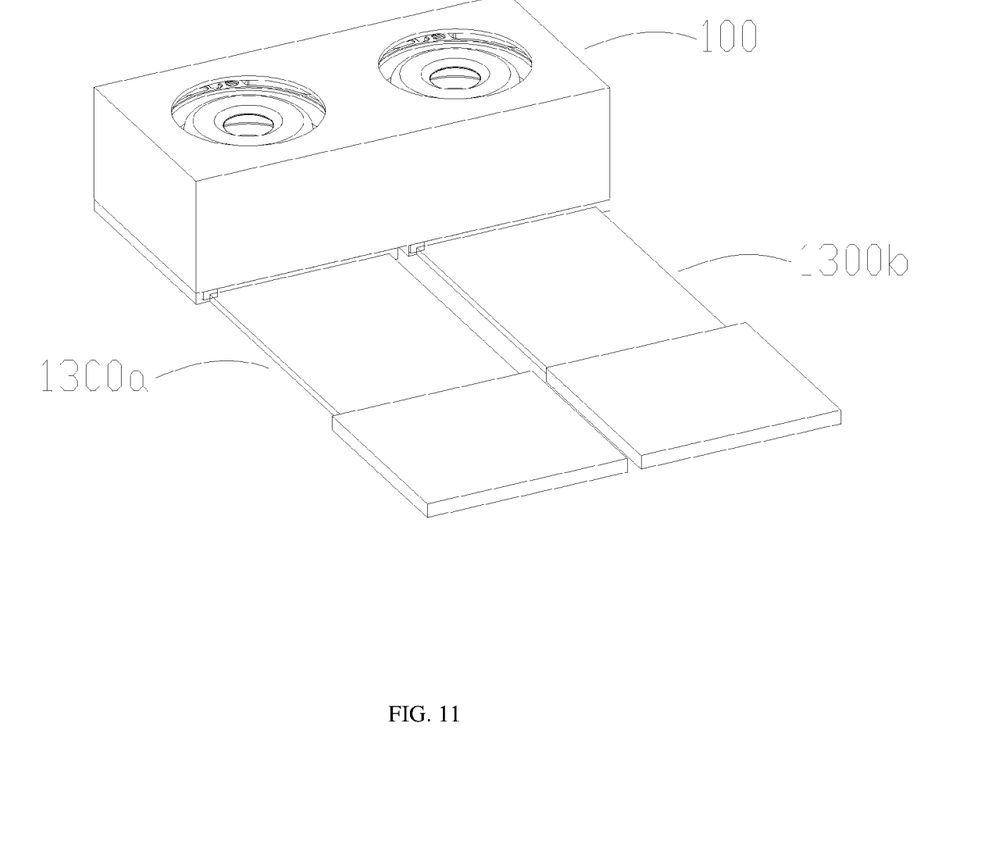
FIG. 11 is a perspective view of a further embodiment of the camera lens module of the present application.
Figure 12:
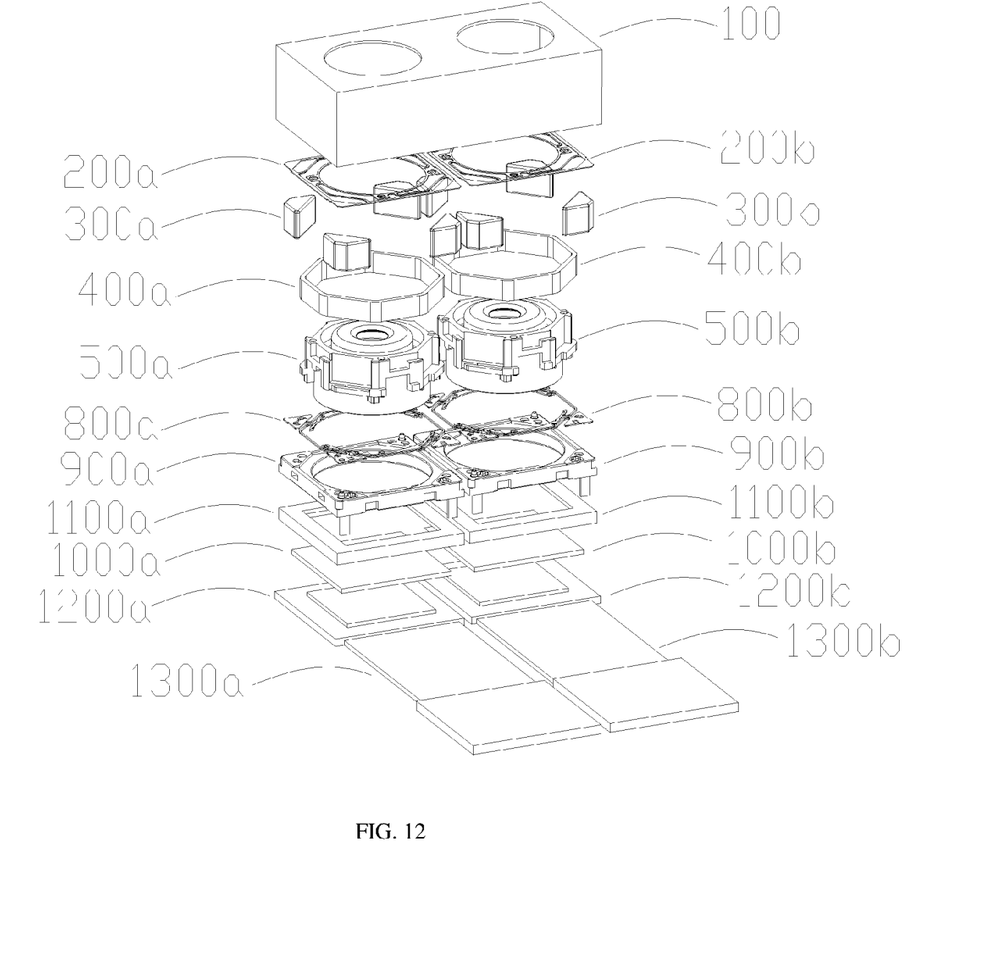
FIG. 12 is an exploded view of the camera lens module shown in FIG. 11.

FIGS. 11 and 12 show another embodiment of the camera lens module of the present application. This embodiment is also a camera lens module having dual camera lens. The difference from the camera lens module of the previous embodiment is that the camera lens module of the present embodiment adopts a dual printed circuit board structure. That is to say the two camera lens units can be provided on two corresponding printed circuit boards respectively. Specifically, as shown in FIGS. 11 and 12, the dual camera lens of the camera lens module of the present embodiment may include a case 100, and first and second bottoms 900a, 900b coupled with the case 100 to form first and second accommodating spaces respectively. The first accommodating space may accommodate therein a first camera lens unit, and the second accommodating space may accommodate therein a second camera lens unit. Two camera lens apertures may be formed on the case 100 that correspond to the first and second camera lens units respectively. The structure of the first and second camera lens units can be the same as the structure of the first and second camera lens units of the previous embodiment, and will not be repeated. In the present embodiment, the first camera lens unit may be provided on the first printed circuit board 1300a. A first frame 1100a may be provided between a first bottom 900a of the first camera lens unit and the first printed circuit board 1300a. A first filter 1000a may be provided on the first frame 1100a. A first image-sensing element 1200a may be provided on the first printed circuit board 1300a. The second camera lens unit may be provided on the second printed circuit board 1300b. A second frame 1100b may be provided between a second bottom 900b of the second camera lens unit and the second printed circuit board 1300b. A second filter 1000b may be provided on the second frame 1100b. A second image-sensing element 1200b may be provided on the second printed circuit board 1300b.

It is understood that the flexibility-adjusting element 1400 in the embodiment shown in FIGS. 6-8 may also apply to the embodiment in FIGS. 9 and 10 as well as the dual camera lens of the camera lens module in FIGS. 11 and 12. Each camera lens unit may be provided with a corresponding flexibility-adjusting element.

In the camera lens module of the present application, the lens assembly can be directly suspended on the upper and lower springs. This eliminates the camera lens mount of the existing camera lens module as well as the connecting screw structure between the camera lens mount and the lens barrel. This can save some space so that the aperture of the lens assembly can be enlarged. The camera lens module of the present application can also reduce the total track length (TTL) of the camera lens of the camera lens module, simplify the assembling process of the camera lens module, and lower the cost of the camera lens module. Furthermore, the camera lens module of the present application is suitable for camera lens module with a single camera lens as well as camera lens module with dual camera lens or multiple camera lenses, and possesses good applicability.

Specific embodiments have been described above with reference to the accompanying drawings. However, the present application is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. A camera lens module, comprising: a case, a bottom coupled with the case to form an accommodating space, and an upper spring, a lens assembly and a lower spring accommodated in the accommodating space, the lens assembly comprising a lens barrel main body and a group of lenses provided in the lens barrel main body, an upper end of the lens barrel main body being suspended on the upper spring and a lower end of the lens barrel main body being suspended on the lower spring, the upper spring being connected with the case, and the lower spring being connected with the bottom;

further comprising: a flexibility-adjusting element, a frame, and a printed circuit board stacked one on top of the other in order, the bottom being provided on the flexibility-adjusting element, the flexibility-adjusting element being used for fine tuning position of the lens assembly on an optical axis, the frame being provided with a filter, and an image-sensing element provided on the printed circuit board.

2. The camera lens module as claimed in claim 1, further comprising: a coil, and a magnetic element that interacts with the coil for driving the lens assembly to move when the coil is energized, the coil being provided on an outer periphery of the lens barrel main body, the magnetic element being provided inside the case and disposed around the lens barrel main body.

3. The camera lens module as claimed in claim 2, further comprising: a spacer block, the spacer block being disposed between the magnetic element and the bottom, and pressing the lower spring on the bottom.

4. The camera lens module as claimed in claim 2, wherein the outer periphery of the lens barrel main body is formed with a step for accommodating the coil, the coil being provided on the step, a gap formed between the coil and the lens barrel main body, an inner edge of an upper end of the case being formed with a downwardly extending insert, and the insert being inserted into the gap.

5. The camera lens module as claimed in claim 1, wherein the upper spring comprises an outer frame, an inner frame, and a flexible arm connecting the outer and inner frames, the outer frame being connected with the case, and the inner frame being connected with the upper end of the lens barrel main body.

6. The camera lens module as claimed in claim 5, wherein the upper end of the lens barrel main body is formed with an annular flange for connecting with the inner frame.

7. The camera lens module as claimed in claim 1, wherein the lower spring comprises an outer connecting plate, an inner connecting plate, and a flexible arm connecting the outer and inner connecting plates, the outer connecting plate being connected with the bottom, and the inner connecting plate being connected with the lower end of the lens barrel main body.

8. The camera lens module as claimed in claim 1, wherein the flexibility-adjusting element comprises a frame-shaped base plate, and a plurality of spring plates being formed on and projected from the base plate, and hollow grooves corresponding to the spring plates being formed on the base plate.

9. The camera lens module as claimed in claim 1, wherein the flexibility-adjusting element is coupled with the bottom.

\* \* \* \* \*